United States Patent [19]
Soupal et al.

[11] Patent Number: 6,135,008
[45] Date of Patent: Oct. 24, 2000

[54] PISTON WITH LUBRICANT-SCRAPING RING AND LUBRICANT RETURN PORTS

[75] Inventors: Thomas R. Soupal, Kansas City, Mo.; Stephen J. Wood, Oskosh, Wis.

[73] Assignee: Haldex Brake Corporation, Kansas City, Mo.

[21] Appl. No.: 09/039,616

[22] Filed: Mar. 16, 1998

[51] Int. Cl.[7] .................................. F16J 1/08; F16J 9/00
[52] U.S. Cl. ............................ 92/160; 92/220; 92/244; 92/245
[58] Field of Search .............................. 92/246, 160, 213, 92/216, 220, 244, 245

[56] References Cited

U.S. PATENT DOCUMENTS

| | | | |
|---|---|---|---|
| Re. 32,395 | 4/1987 | Geffroy et al. ........................... | 92/246 |
| 1,751,445 | 3/1930 | Davis . | |
| 1,830,937 | 11/1931 | Falkenstein .............................. | 92/246 |
| 2,088,357 | 7/1937 | Wuestefeldt .............................. | 92/246 |
| 2,218,638 | 10/1940 | Christenson ............................. | 92/244 |
| 2,471,477 | 5/1949 | Bonnaud .................................. | 92/244 |
| 2,889,183 | 6/1959 | Peras . | |
| 2,895,772 | 7/1959 | Chapman et al. . | |
| 3,182,569 | 5/1965 | Hieber . | |
| 3,608,911 | 9/1971 | Prasse et al. . | |
| 4,714,259 | 12/1987 | Mack et al. . | |
| 4,875,405 | 10/1989 | Bernhardt et al. . | |
| 5,083,593 | 1/1992 | Fogg . | |
| 5,231,917 | 8/1993 | Wood . | |
| 5,474,307 | 12/1995 | DeBiasse et al. . | |

*Primary Examiner*—F. Daniel Lopez
*Attorney, Agent, or Firm*—St. Onge Steward Johnston & Reens LLC

[57] ABSTRACT

A piston assembly including a piston having a work surface, a sidewall extending from the work surface, and ports in the sidewall. The piston assembly also includes a flexible lubricant-scraping ring clamped to the piston between the work surface and the ports, with the lubricant-scraping ring having an outer edge extending outwardly beyond the sidewall.

12 Claims, 3 Drawing Sheets

PISTON WITH LUBRICANT-SCRAPING RING AND LUBRICANT RETURN PORTS

FIELD OF THE INVENTION

The present invention relates to a piston assembly and, more particularly, to a piston assembly including a piston with a lubricant-scraping ring clamped above lubricant return ports.

BACKGROUND OF THE INVENTION

Piston rings are important to the efficient operation of air compressors and internal combustion engines. Since the reciprocating motion of a piston within a cylinder is the greatest contributor to friction in a compressor and an engine, the use of a lubricant such as oil between the piston and the cylinder is a must for efficient operation. The lubricant is normally provided from a crankcase adjacent the cylinder. To prevent the lubricant from leaking past the piston into a work chamber defined by the cylinder and piston, pistons are usually provided with piston rings. Piston rings are also provided to prevent compressed air or compressed combustion gases in the work chamber from leaking past the piston into the crankcase.

U.S. Pat. No. 2,895,772 to Chapman et al., for example, discloses a packing ring assembly for providing a seal between a piston and a cylinder. The assembly includes axially opposed sealing cups clamped between two pistons. Chapman et al., however, does not disclose means for efficiently directing lubricant scraped from the cylinder back into a crankcase.

U.S. Pat. No. 3,182,569 to Hieber discloses a seal structure for a piston in a cylinder. The structure includes two opposing flexible cup-type seals positioned in grooves of the piston, with the ends of the piston swaged to clamp the seals. Heiber, however, also does not disclose means for efficiently directing lubricant scraped from the cylinder back into a crankcase.

U.S. Pat. No. 3,608,911 to Prasse et al. discloses a piston for an internal combustion engine. The piston includes a U-shaped oil control ring seated within a groove and expanded outwardly by a circumferentially expanding spring. The piston also includes ports extending from the groove, and the oil control ring has holes, apparently for returning oil scraped by the ring from the cylinder. The ring, however, is not clamped to the piston, is made of metal and presumably includes a gap to allow the ring to be fitted onto the piston.

U.S. Pat. No. 5,231,917 to Wood discloses a wobble piston for use in a non-lubricated air compressor. The piston includes a flexible, annular seal clamped adjacent to the top of the piston. Wood, however, does not disclose means for efficiently directing lubricant scraped from the cylinder back into a crankcase.

U.S. Pat. No. 5,474,307 to DeBiasse et al. discloses a piston ring configuration for use in an internal combustion engine. The configuration includes wiper members that fit around gapped combustion rings. While the piston includes drain ports that allow oil scraped from the cylinder to flow into the piston and down into the crankcase, the wiper members are not clamped to the piston, thereby requiring a relatively complicated ring assembly to prevent compressed gases and oil from escaping between the combustion ring and the piston.

It should be understood that, while most of these patents disclose piston rings for use with internal combustion engines, there can be different requirements for the piston rings of an internal combustion engine and the piston rings of a compressor. For example, no lubricant at all should enter the cylinder in a compressor since the oil will undesirably contaminate the discharged compressed air. With an engine, in contrast, a little lubricant entering the cylinder is often desirable since it can help lubricate cylinder valves at an opposite end of the cylinder. In addition, piston rings for use with internal combustion engines must be designed to withstand the high temperatures caused by combustion. Engine piston rings, therefore, are usually made of rigid, heat resistant material and include a gap to allow the ring to be fitted onto the piston and allow for thermal expansion. These gaps, however, can allow lubricant to pass into the cylinder. Furthermore, because of their higher performance nature, engine piston rings are normally required to be manufactured to tighter tolerances and are, therefore, relatively expensive.

What is desired, therefore, is a piston assembly having a lubricant-scraping ring that allows a lubricant, such as oil, to be used between a piston of the piston assembly and a cylinder within which the piston reciprocates, yet prevents the lubricant from leaking past the piston. Preferably, the ring will be clamped to the piston to prevent lubricant from passing between the ring itself and the piston. In addition, the piston assembly will desirably include means for efficiently directing lubricant scraped from the cylinder back into a crankcase adjacent the cylinder. Preferably, the lubricant-scraping ring will have a flexible outer edge that will conform to the cylinder wall in order to maximize scraping while lowering manufacturing tolerances. Furthermore, it is desired that the outer edge of the ring be continuous, as opposed to having a gap as some piston rings do, to ensure that the lubricant does not have any gaps to pass through.

SUMMARY OF THE INVENTION

A general object of the present invention, accordingly, is to provide a piston assembly having a lubricant-scraping ring that allows a lubricant, such as oil, to be used between a piston of the piston assembly and a cylinder within which the piston reciprocates, yet prevents the lubricant from leaking past the piston.

A more particular object of the present invention is to provide a piston assembly having a lubricant-scraping ring clamped to the piston to prevent lubricant from passing between the ring itself and the piston.

Another object of the present invention is to provide a piston assembly having means for efficiently directing lubricant scraped from the cylinder into a crankcase adjacent the cylinder.

An additional object of the present invention is to provide a piston assembly including a lubricant-scraping ring having a flexible outer edge that will conform to the cylinder wall in order to maximize scraping while decreasing the manufacturing tolerances of the ring.

A further object of the present invention is to provide a piston assembly including a lubricant-scraping ring having a continuous outer edge in order to eliminate gaps that could allow the passage of lubricant.

These and other objects of the present invention are achieved by a piston assembly including a piston having a work surface, a sidewall extending from the work surface, and ports in the sidewall. The piston assembly also includes a lubricant-scraping ring clamped to the piston between the work surface and the ports, with the lubricant-scraping ring having an outer edge extending outwardly beyond the sidewall.

The present invention, therefore, provides a piston assembly having a lubricant-scraping ring that allows a lubricant, such as oil, to be used between a piston of the piston assembly and a cylinder within which the piston reciprocates, yet prevents the lubricant from leaking past the piston. The lubricant-scraping ring is clamped to the piston to prevent lubricant from passing between the ring itself and the piston. The piston assembly also has means, in the form of the ports, for efficiently directing lubricant scraped from the cylinder into a crankcase adjacent the cylinder.

According to one aspect of the present invention, the outer edge of the lubricant-scraping ring also extends in an axial direction away from the work surface to more efficiently scrap lubricant.

According to another aspect of the present invention, the outer edge of the lubricant-scraping ring is flexible so that it will conform to the cylinder wall.

According to another aspect of the present invention, the outer edge of the lubricant-scraping ring is continuous.

The invention and its particular features and advantages will become more apparent from the following detailed description considered with reference to the accompanying drawings.

DETAILED DESCRIPTION OF THE INVENTION

Figure 1:
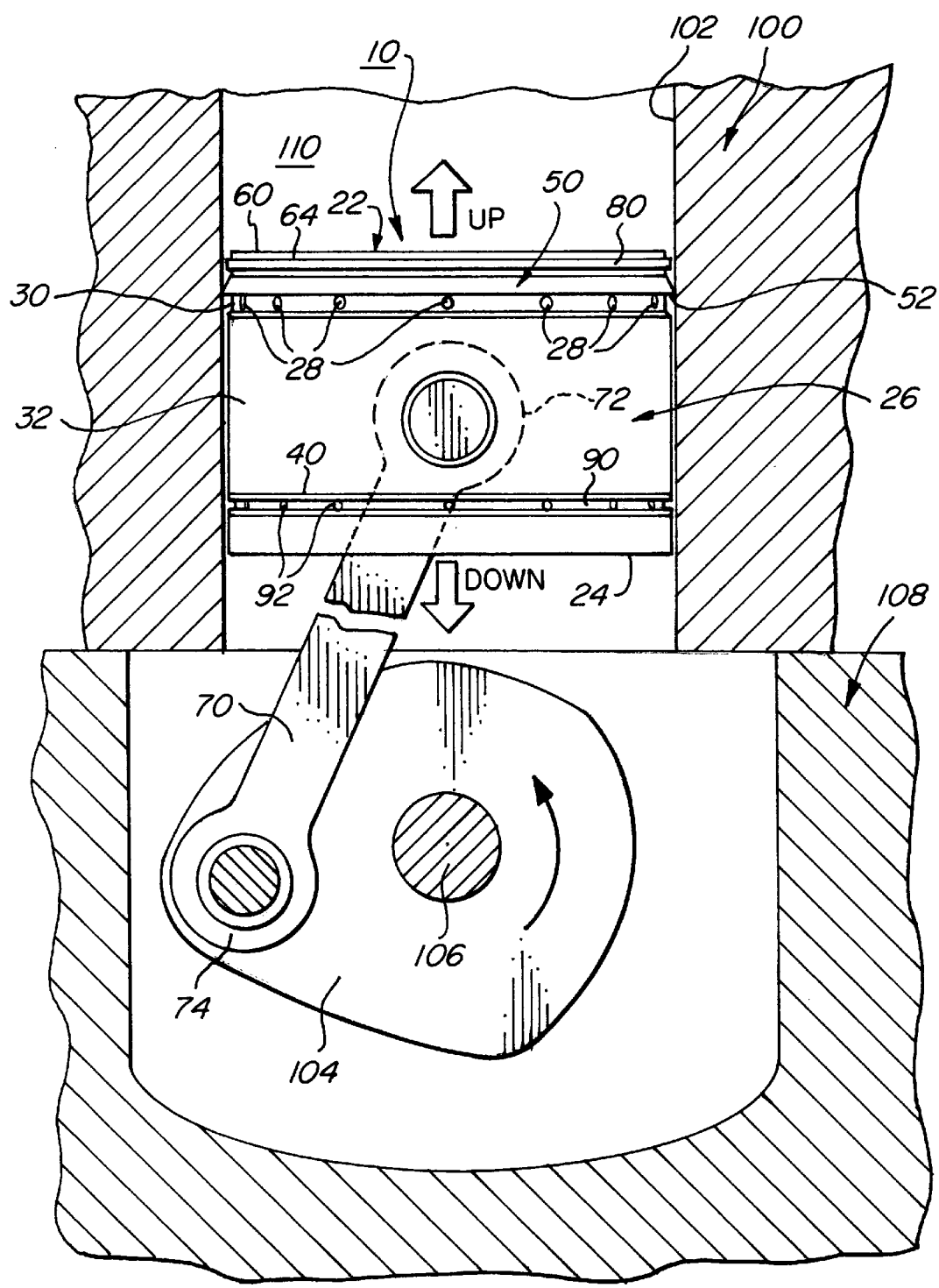
FIG. 1 is a side elevation view of a piston assembly according to the present invention illustrated within schematic representations of a cylinder and a crankcase.
Figure 2:
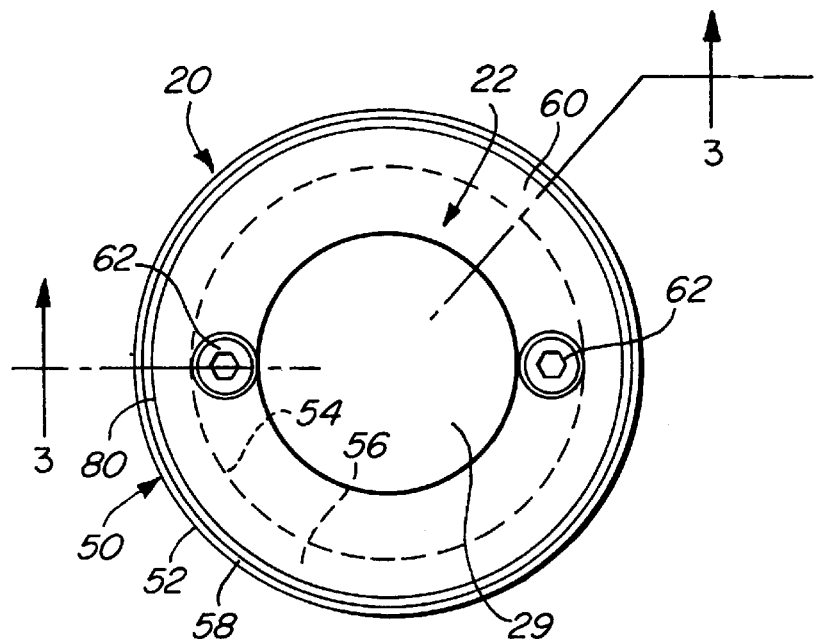
FIG. 2 is a top plan view of the piston assembly of FIG. 1.
Figure 3:
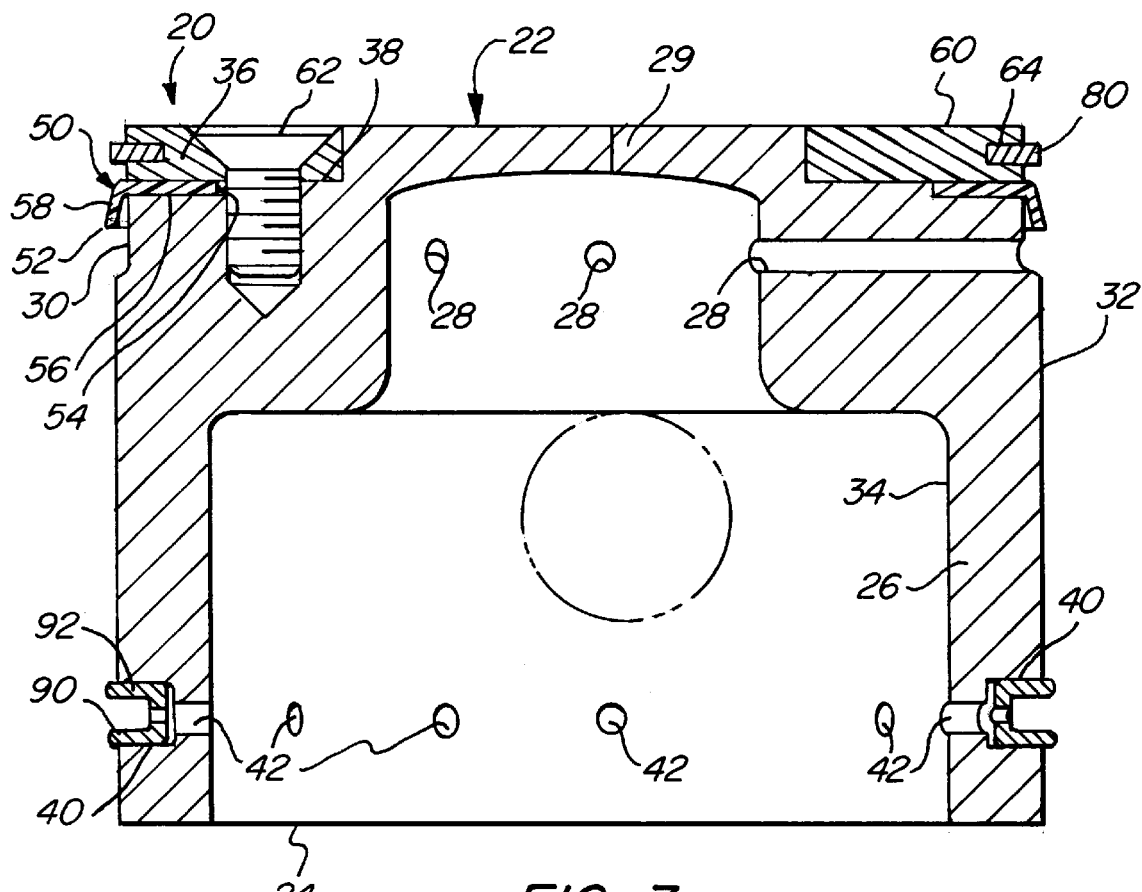
FIG. 3 is an enlarged, cross-sectional view of the piston assembly of FIG. 1 taken along 3—3 in FIG. 2.

Referring to FIGS. 1 through 3, the present invention provides a piston assembly 10 for use in a cylinder 100. The piston assembly 10 includes a piston 20 for reciprocating within the cylinder 100, as shown by the arrows. The piston 20 includes a work surface 22, an open end 24, a sidewall 26 extending from the work surface to the open end, and primary lubricant return ports 28 in the sidewall. The piston assembly 10 also includes a lubricant-scraping ring 50 clamped to the piston between the work surface 22 and the ports 28, with the lubricant-scraping ring having an outer edge 52 extending radially outwardly beyond the sidewall 26.

The present invention, therefore, provides a piston assembly 10 having a lubricant-scraping ring 60 that allows a lubricant, such as oil, to be used between the piston 20 of the piston assembly and a wall 102 of the cylinder 100 within which the piston reciprocates, yet prevents the lubricant from leaking past the piston into a work chamber 110 defined by the cylinder and the piston (the work chamber of an engine is more commonly known as a combustion chamber, while the work chamber of a compressor is known as a compression chamber). The lubricant-scraping ring 50 is clamped to the piston 20 to prevent lubricant from passing between the ring itself and the piston. The piston assembly 10 also includes means, in the form of the primary lubricant return ports 28, for efficiently directing lubricant scraped from the cylinder wall 102 away from the work chamber 110.

Preferably, the outer edge 52 of the lubricant-scraping ring 50 extends at an angle between radially outwardly and axially away from the work surface 22 of the piston 20, whereby the lubricant-scraping ring 50 more efficiently scrapes lubricant from the cylinder wall 102.

The outer edge 52 of the lubricant-scraping ring 50 is preferably also flexible, so that the outer edge conforms to the cylinder wall 102 in order to maximize scraping effectiveness while increasing the manufacturing tolerances available for the ring, the piston 20 and the cylinder 100.

In addition, the outer edge 52 of the lubricant-scraping ring 50 is preferably continuous in order to eliminate gaps that could allow the passage of lubricant.

In a most preferred embodiment illustrated in FIGS. 1 through 3, the piston assembly 10 includes the piston 20 slideably received within the cylinder 100 of a compressor or an internal combustion engine. The piston 20 is pivotally connected to one end 72 of a connecting rod 70, which in turn is pivotally connected at an opposite end 74 to an eccentric 104 of a crankshaft 106 housed within a crankcase 108 adjacent the cylinder. As is known, the piston 20 in a compressor is driven by the crankshaft 108 to compress gases within the work chamber 110, while in an internal combustion engine, compressed combustion gases from an ignited fuel/air mixture in the work chamber push the piston to drive the crankshaft. Although not shown but well known in the art, in addition to the cylinder, crankcase and crank shaft, a compressor also includes a motor for turning the crankshaft and a discharge port at an end of the cylinder opposite the crankcase.

As shown by the up and down arrows, the piston 20 reciprocates within the cylinder 100 as the crankshaft 106 rotates. For ease of description, FIG. 1 shows the cylinder 100 positioned above the crankcase 108. The reader should understand, however, that the cylinder 100 could be positioned sideways or at an angle with respect to the crankcase 108.

As shown best in FIG. 3, the work surface 22 of the piston 20 is formed by an endwall 29 of the piston, and an annular axial clamp 60 discussed in more detail below. The sidewall 26 of the piston 20 has a smaller diameter outer surface 30 adjacent the endwall 29, a larger diameter outer surface 32 extending from the smaller diameter outer surface to the open end 24, and an inner surface 34. The larger diameter outer surface 32 is sized to guide the piston 20 within the cylinder 100. The endwall 29 of the piston 20 includes an annular first step 36 and an annular second step 38 adjacent the smaller diameter outer surface 30 of the sidewall 26.

The primary lubricant return ports 28 extend, parallel with the endwall 29, from the smaller diameter outer surface 30 to the inner surface 34 of the sidewall 26. The primary lubricant return ports 28, however, could alternatively angle downwardly from the smaller diameter outer surface 30 to the inner surface 34.

The lubricant-scraping ring 50 includes an inner edge 54 and an annular radial segment 56 extending radially outwardly from the inner edge and an annular angled segment 58 extending from the radial segment to the outer edge 52 of the ring. The radial segment 56 is seated on the first step 36 of the endwall 29, and the axial clamp 60 is seated on the second step 38 of the endwall over the radial segment and is secured to the piston 20, with screws 62 for example. The lubricant-scraping ring 50 has a thickness greater than the depth of the first step 36 of the endwall 29 so that the radial segment 56 is securely clamped to the piston 20 by the axial clamp 60 in a fluid-tight manner. The radial segment 56 of the ring 50 also has a width that is much greater than its thickness in order to make the passage of lubricant between the ring and the piston 20 more unlikely.

It should be noted that while the lubricant-scraping ring 50 is shown axially clamped to the piston 20, the scope of the present invention also encompasses a lubricant-scraping ring radially clamped to the piston. For example, the lubricantscraping ring could further include an axial segment extending from the radial segment and clamped to the piston with a radial clamp, as opposed to the radial segment 56 being clamped with the axial clamp 60. In general, it is only necessary that the ring 50 be positively sealed to the piston 20 to prevent leakage between the piston and the ring. For example, the ring 50 could also be tightly wedged into a narrow groove in the piston 20.

Referring to FIG. 1, the angled segment 58 of the ring 50 extends radially outwardly and axially downwardly (away from the work surface 22 and towards the open end 24 of the piston 20) at an angle of no greater than forty-five degrees with respect to the sidewall 26 of the piston 20. The outer edge 52 of the ring 50 extends beyond the larger diameter outer surface 32 of the sidewall 26 and contacts the cylinder wall 102.

As shown best in FIG. 2, the entire lubricant-scraping ring 50 including the outer edge 52 is continuous and without gaps. In addition, the ring is made of a flexible material. For low temperature use in a compressor the material can be rubber for example, while for high temperature use in an engine the material must be flexible yet remain stable at high temperatures. The ring 50 is preferably made from a flexible material so that the outer edge 52 conforms to the contour of the cylinder wall 102 to more efficiently scrape lubricant, yet not require that the ring, the cylinder 100 and the piston 20 be manufactured to high tolerances. It should be noted, however, that while the ring 50 is made from a flexible material, the ring is rigid enough to maintain the angled segment 58 angled in an axial direction away from the work surface 22 of the piston 20 and prevent the angled segment from "flip-flopping" or repeatedly reversing its axial direction as the piston reciprocates within the cylinder 100. The scope of the invention also encompasses a ring 50 made from a more rigid material such as Teflon (a trademark of du Pont), for example. In addition, the flexible ring or piston assembly may include springs or expanders for maintaining continuous contact between the outer edge 52 of the ring 50 and the cylinder wall 102.

During operation, as the piston 20 moves away from the crankcase 108 into the work chamber, or upwardly as shown in FIG. 1, the angled segment 58 and the outer edge 52 of the lubricant-scraping ring 50 prevent lubricant (not shown) from the crankcase from passing beyond the ring into the work chamber. Then, as the piston 20 moves towards the crankcase 108, or downwardly as shown in FIG. 1, the outer edge 52 of the lubricant-scraping ring 50 scrapes the lubricant from the cylinder wall 102, with much of the lubricant then passing through the primary lubricant return ports 28 and back into the crankcase through the open end 24 of the piston 20. The piston assembly 10 according to the present invention, therefore, allows lubricant to be used between the larger diameter outer surface 32 of the sidewall 26 of the piston 20 and the cylinder wall 102, yet prevents the lubricant from leaking past the piston into the work chamber 110.

The piston assembly 100 can also include other conventional types of piston rings, such as a compression ring 80 and an oil control ring 90, for example, as shown in FIGS. 1 through 3. The compression ring 80 is positioned between the work surface 22 of the piston 20 and the lubricant-scraping ring 50 in a circumferential groove 64 in the axial clamp 60. The compression ring 80 is made of metal, has a gap and is tempered to be biased outwardly. In addition to preventing compressed gas from leaking past the piston 20, the compression ring 80 is also helpful in protecting the lubricant-scraping ring 50 from dirt and heat. The oil control ring 90, which is U-shaped and faces outwardly, is seated in a circumferential groove 40 in the larger diameter outer surface 32 of the sidewall 26 between the lubricant-scraping ring 50 and the open end 24 of the piston. The oil control ring 90 is made of metal, has a gap (not shown) and is tempered to be biased outwardly. Secondary lubricant return ports 42 extend from the groove 40 to the inner surface 34 of the sidewall 26, and the oil control ring 90 has holes 92 to allow lubricant to pass therethrough.

Figure 4:
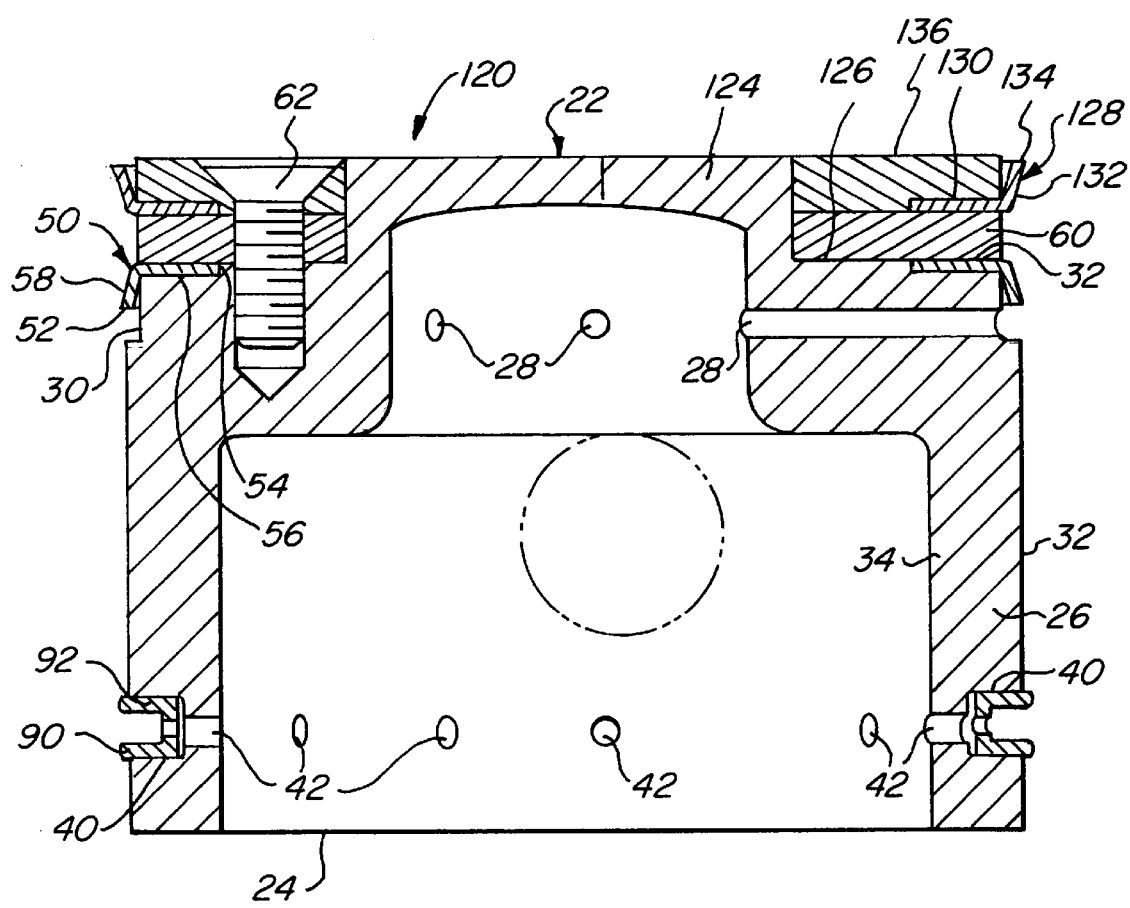
FIG. 4 is an enlarged, cross-sectional view of another piston assembly according to the present invention.

Referring to FIG. 4, another piston 120 according to the present invention is shown. The piston 120 is similar to the piston 20 of FIGS. 1 through 3 and elements that are the same have the same reference numerals. The piston 120 includes an endwall 124 with an annular second step 126 that is deeper than the second step 38 of FIGS. 1 through 3. In place of the compression ring 80 of FIGS. 1 through 3, the piston 120 includes a compression ring 128 similar to the oil-scraping ring 50. The compression ring 128 includes a radial segment 130 seated on the axial clamp 60, an angled segment 132 and an outer edge 134. The angled segment 132, however, is angled radially outwardly and axially upwardly towards the work chamber 110 to better prevent compressed gas from leaking past the piston 120. The piston 120 also includes a second axial clamp 136 secured with the screws 62 to clamp the compression ring 128 to the piston.

A piston according to the present invention can include more than one clamped, lubricant-scraping ring, as is necessary. The piston can also include any number of conventional piston rings in any combination, either below or above the clamped lubricant-scraping rings, as is necessary. If more than one clamped, lubricant-scraping ring according to the present invention is used, then any number of conventional piston rings in any combination can be used below, above or between the clamped lubricant scraping rings, as is necessary.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A compressor comprising:
   a crankcase;
   a crankshaft within the crankcase;
   a motor for driving the crankshaft;
   a cylinder communicating with the crankcase; and
   a piston assembly including,
      a piston slidingly received within the cylinder, the piston including a work surface including an endwall of the piston and a clamp and a sidewall extending from the endwall toward the crankcase,
      a piston rod connecting the piston to the crankshaft,
      a plurality of ports in the sidewall of the piston,
      a lubricant-scraping ring seated on the endwall of the piston and having a continuous outer edge extending radially outwardly beyond the sidewall;
      the clamp clamping the lubricant-scraping ring to the endwall and, a compression ring fitted in a circumferential groove on the clamp between the work surface and the lubricant-scraping ring.

2. A compressor according to claim 1 wherein the outer edge of the lubricant-scraping ring of the piston assembly extends at an angle between radially outwardly and axially away from the endwall of the piston.

3. A compressor according to claim 1 wherein the outer edge of the lubricant-scraping ring of the piston assembly is flexible.

4. A compressor according to claim 1 wherein the piston rod of the piston assembly is pivotally connected to the piston.

5. A compressor according to claim 1 wherein the lubricant-scraping ring of the piston assembly includes a radial segment clamped to the endwall with the clamp and an angled segment extending from the radial segment to the outer edge at an angle between radially outwardly and axially away from the endwall of the piston.

6. A piston comprising:
   a work surface including an endwall of the piston and a clamp;
   a sidewall extending axially from the endwall to an open end of the piston;
   a plurality of ports in the sidewall;
   a lubricant-scraping ring positively sealed to the piston by the clamp between the ports and the work surface wherein the lubricant-scraping ring includes a continuous outer edge extending radially outward beyond the sidewall; and,
   a compression ring fitted in a circumferential groove on the clamp between the work surface and the lubricant-scraping ring.

7. A piston according to claim 6 wherein the outer edge of the lubricant-scraping ring also extends away from the work surface.

8. A piston according to claim 6 wherein the outer edge of the lubricant-scraping ring is flexible.

9. A piston according to claim 6 wherein the lubricant-scraping ring is axially clamped to the piston by the clamp.

10. A piston according to claim 6 wherein the endwall includes a first step and a second step axially displaced below the work surface at the periphery of the endwall.

11. A piston according to claim 10 wherein the lubricant-scraping ring is seated on the first step and the clamp is seated on the second step axially above the lubricant-scraping ring.

12. A piston according to claim 11 wherein an outer edge of the compression ring also extends axially toward the work surface.

* * * * *